United States Patent
Kogan (10) Patent No.: US 11,077,560 B2
(45) Date of Patent: Aug. 3, 2021

(54) MANIPULATOR SYSTEM AND METHOD FOR IDENTIFYING OPERATING DEVICES

(71) Applicant: KUKA Roboter GmbH, Augsburg (DE)

(72) Inventor: Yevgen Kogan, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 316 days.

(21) Appl. No.: 15/777,449

(22) PCT Filed: Nov. 29, 2016

(86) PCT No.: PCT/EP2016/079096
§ 371 (c)(1),
(2) Date: May 18, 2018

(87) PCT Pub. No.: WO2017/093234
PCT Pub. Date: Jun. 8, 2017

(65) Prior Publication Data
US 2018/0326592 A1    Nov. 15, 2018

(30) Foreign Application Priority Data
Dec. 4, 2015    (DE) ............ 10 2015 224 308.7

(51) Int. Cl.
*B25J 13/00* (2006.01)
*B25J 9/16* (2006.01)
(Continued)

(52) U.S. Cl.
CPC .......... *B25J 13/006* (2013.01); *B25J 9/1674* (2013.01); *B25J 19/06* (2013.01); *G08C 17/02* (2013.01);
(Continued)

(58) Field of Classification Search
CPC ........ B25J 9/1674; B25J 13/006; B25J 19/06; G05B 2219/36542; G05B 2219/40538;
(Continued)

(56) References Cited

U.S. PATENT DOCUMENTS 6,167,464 A    12/2000  Kretschmann
6,615,109 B1    9/2003  Matsuoka et al.
(Continued)

FOREIGN PATENT DOCUMENTS

DE    102011083817 A1    4/2013
DE    102014201468 B3 *    2/2015    ......... H04L 12/2803
(Continued)

OTHER PUBLICATIONS

The English translation of the International Search Report and Written Opinion, dated Feb. 1, 2017, in the corresponding PCT Appl. No. PCT/EP2016/079096.
(Continued)

*Primary Examiner* — Robert T Nguyen (57) ABSTRACT

A manipulator system includes at least one manipulator and a control device assigned to the manipulator; and at least one mobile operating device for controlling the at least one manipulator. In addition, an electronic display device is provided, which is arranged to display at least one optically readable identifier, and at least one optical reading device is provided and arranged to detect the displayed optically readable identifier. The manipulator system is arranged to release control of the manipulator by means of the mobile operating device when the optically readable identifier has been correctly detected by the optical reading device.

20 Claims, 3 Drawing Sheets

(51) Int. Cl.
*G08C 17/02* (2006.01)
*B25J 19/06* (2006.01)

(52) U.S. Cl.
CPC .............. *G05B 2219/36542* (2013.01); *G05B 2219/40538* (2013.01); *G08C 2201/30* (2013.01); *G08C 2201/93* (2013.01)

(58) Field of Classification Search
CPC . G08C 17/02; G08C 2201/30; G08C 2201/93
See application file for complete search history.

(56) References Cited

U.S. PATENT DOCUMENTS

| | | | |
|---|---|---|---|
| 8,344,848 | B2 | 1/2013 | Moschl et al. |
| 9,268,920 | B1* | 2/2016 | Butler ...................... G06F 21/10 |
| 2013/0123987 | A1* | 5/2013 | Kase ....................... A63H 30/04 |
| | | | 700/259 |
| 2013/0158708 | A1 | 6/2013 | Emmertz et al. |
| 2015/0017973 | A1* | 1/2015 | Gold ...................... H04L 67/025 |
| | | | 455/420 |
| 2015/0048924 | A1* | 2/2015 | Feldstein ................. G07C 9/27 |
| | | | 340/5.51 |
| 2015/0134115 | A1 | 5/2015 | Gong et al. |
| 2015/0197009 | A1* | 7/2015 | Melikian ................ B25J 9/1664 |
| | | | 700/259 |
| 2016/0231724 | A1 | 8/2016 | Bauer et al. |
| 2019/0015990 | A1* | 1/2019 | Hillen ................... B25J 9/1697 |

FOREIGN PATENT DOCUMENTS

| | | |
|---|---|---|
| DE | 102014201468 B3 | 2/2015 |
| DE | 102014207406 A1 | 10/2015 |

OTHER PUBLICATIONS

The English translation of the Examination report, dated Sep. 29, 2016, in German priority application No. 10 2015 224 308.7.

* cited by examiner

MANIPULATOR SYSTEM AND METHOD FOR IDENTIFYING OPERATING DEVICES

CROSS-REFERENCE TO RELATED APPLICATIONS

This application is a National Stage Application of PCT/EP2016/079096, filed Nov. 29, 2016, which claims priority from German Patent Application No. 10 2015 224 308.7, filed Dec. 4, 2015.

FIELD OF THE INVENTION

The invention relates to a manipulator system and a method for identifying an operating device for controlling at least one manipulator of a manipulator system.

BACKGROUND

Mobile operating devices and especially wireless operating devices, such as laptop computers, tablet computers, smartphones and smart watches, play an increasingly important role in the control and/or operation of industrial plants, such as manipulator systems.

Manipulator systems typically include one or more manipulators or robots to enable physical interaction with the environment. Robots (and especially industrial robots) are freely programmable, program-controlled handling devices. The actual robot mechanics is usually referred to as a manipulator, which can consist of a large number of moving links or axes. The individual axes can be moved by targeted control of motors (and especially servomotors).

Such manipulator systems have many possible applications and are used, for example, in the automotive industry in production and assembly. Operating devices are used to control the manipulator, allowing the manipulator to be controlled manually or to change or program movement paths, sequence programs and the like of the manipulator. Nowadays, the control devices often have a graphical user interface (GUI).

The trend is moving away from stationary control devices and towards mobile, universal control devices that can be used as a supplement to stationary or stand-alone control devices. Another trend is the use of existing consumer electronics devices such as laptop computers, tablet computers, smart phones or smart watches and the like as operating devices.

This makes it possible to develop universal operating devices that can be used to control a large number of different machines, systems and manipulator systems without the user having to change the operating device. A uniform, universal control device also reduces the training required by a user and thus reduces the risk of possible operating errors caused by a large number of different control devices.

Mobile operating devices can be used from any position, as they are not stationary. For example, a manipulator system can be controlled manually in the immediate vicinity of the manipulator to be controlled. The mobile operating device allows the user to move freely, e.g., to assume a favorable position from which he can easily see the manipulator to be controlled.

While free movement can have great advantages for operation, it also entails certain risks. For example, it may happen that the operating device is coupled to another manipulator system or another manipulator to be controlled than is assumed by the user. If, for example, the user is operating a first manipulator of a system and wants to switch to another manipulator in order to carry out further work steps there, it must be ensured that the coupling with the other manipulator has actually taken place. If, for example, the mobile operating device is not coupled with the other manipulator due to an operating error and the user does not recognize this in time, the user unintentionally continues to control the first manipulator. This can have dangerous consequences, as the user does not pay attention to the first manipulator in such a case, as he expects movement of the allegedly coupled other manipulator.

Mobile operating devices are known from the state of the art, which include an integrated camera with which a specific QR code, which is permanently attached to an industrial plant, can be recognized. If the mobile control device recognizes the specific QR code, a specific graphical user interface is loaded onto the mobile control device, which is suitable for controlling the identified system. This procedure only ensures that there is a correct coupling between the mobile operating device and the system to be controlled, but it cannot reliably exclude the problems mentioned above. In particular, misuse (e.g., to shorten certain work steps) is possible because the specific code is fixed and can be photographed or printed, for example, to release coupling even if the operating device is not in the vicinity of the system.

The task of the present invention is therefore to provide a method and a manipulator system that reduces or eliminates the disadvantages described above.

DETAILED DESCRIPTION OF THE INVENTION

The task is solved by a manipulator system according to claim 1 and a procedure according to claim 10.

In particular, the task is solved by a manipulator system comprising at least one manipulator and a control device assigned to the manipulator, as well as a mobile operating device for controlling the at least one manipulator and/or the control device, the mobile operating device having a preferably graphical user interface (GUI). Furthermore, at least one electronic display device is provided, such as a display, which is arranged to display an optically readable identifier (optical identification) and at least one optical reading device, which is arranged to detect the displayed optically readable identifier. The electronic display device may be assigned to the control device or the mobile control device and the optical reader with the respective other control device or mobile control device. The manipulator system is arranged to release the control of the manipulator and/or the control device for control by means of the mobile operating device if the optically readable identifier has been correctly detected by the optical reading device. This means that the manipulator can only be operated or controlled via the mobile operating device, and in particular via the graphical user interface, once it has been correctly detected.

The control device serves to control the at least one manipulator. The control device can comprise both software and hardware and be integrated into the manipulator or be an independent system separate from the manipulator. The mobile operating device is preferably a universal mobile operating device, which is suitable or set up to control the at least one manipulator and/or the control device. Preferably, several mobile operating devices can be coupled to the control device; however, only a defined number of operating devices is or can be coupled to the control device at the same time. The mobile control device is coupled to the control device exactly when the control of the at least one manipulator is possible and released by means of the mobile control device and/or when data and/or parameter sets of the control device are to be changed by means of the mobile control device, which preferably have an influence on the movement of the manipulator. Preferably only one mobile operating device is assigned to each manipulator at a time, in order to avoid operating errors that can result from two users accessing the manipulator simultaneously and without coordination. If a control device controls several manipulators, it is possible to assign a separate mobile operating device to each of these manipulators.

The mobile operating device preferably has a graphical user interface (GUI), which is displayed on a suitable display, such as an LCD display, a TFT display, an OLED display or the like. The graphical user interface allows the user to easily control a manipulator via touch screen and/or other input devices, such as a keyboard or joystick. Preferably, visual feedback is included on the graphical user interface, e.g., in the form of a real image, in the form of a model or in the form of status parameters, in order to release intuitive control.

The electronic display device for displaying the optically readable identifier is preferably also a display, such as an LCD display, a TFT display, an OLED display or the like. However, it can consist of one or more signal lamps, such as LEDs, with which an optically readable identifier can be displayed. In the case where the electronic display device is assigned to the visual identifier of the control device, preferably the same display or electronic display device on which the graphical user interface is also displayed is used.

The display of the graphical user interface (GUI) on the mobile operating device, which is located near the manipulator, is not necessarily guaranteed by the use of wireless technologies and/or web technologies. For example, the GUI can be displayed on a remote mobile operating device. Displaying the optically readable ID directly in the GUI ensures that the GUI is displayed on the mobile operating device, which is located near the manipulator. The optical identifier displayed, for example, in the GUI of the human-machine interface (HMI), can then be read by the optical reader of the manipulator system. This ensures that the operating device with the GUI is actually in the immediate vicinity of the manipulator system.

Preferably, the GUI itself can also be used as an optical identifier. If the optical appearance of the GUI is known and characteristic, the GUI or a part of the GUI can be captured by means of the optical reader of the manipulator system and then evaluated. This also ensures that the operating device with the GUI is actually in the immediate vicinity of the manipulator system.

An optically readable identifier can, for example, be a machine-readable one- or two-dimensional code, in particular a QR code, a bar code or a sequence of optical signals that varies in time, as is known from transaction authorization number (TAN) generation in online banking, for example. Optically readable identifiers can also include a sequence of numbers, a combination of on and off signal lamps or the like. It is also conceivable that a particular image or a particular display or part of it, which is displayed on the electronic display device, is recognized by the optical reader.

The optical reader may be a camera, scanner or laser scanner or the like, for example, and is preferably integrated in the mobile control device or mounted near the manipulator to be controlled, if the optical reader is assigned to the control device. Since control of the manipulator is not released until the optically readable identifier has been correctly detected by the optical reader, it can be ensured that the mobile control device is at this time in the vicinity of the optical reader of the control device or in the vicinity of the electronic display device of the control device. In particular, it can be ensured that the graphical user interface on the mobile operating device, which is located near the manipulator, is displayed correctly. To ensure that the mobile operating device is also in the vicinity of the manipulator to be controlled, the optical reading device or the electronic display device assigned to the control device is arranged on or in the immediate vicinity of the manipulator to be controlled.

Preferably, the mobile operating device comprises a first wireless communication device and the controller comprises a second wireless communication device adapted to transmit data of the optically readable identifier. For example, the operating device connects wirelessly to the control device and the control device transmits data of the optical identifier to the operating device automatically or at the user's command. The operating device then displays the optically readable identifier corresponding to the data being transmitted on its electronic display device. In this way, dynamic identifiers, which are changed for each coupling operation, can be used advantageously. Misuse by storing the optical identifier can thus be prevented, since the transmitted identifier can only be used once. This method also works analogously in reverse, i.e., the data of the optical identifier can also be transmitted from the operating device to the control device, and the control device then displays the corresponding identifier. The optically readable identifier displayed on the operating device can then be read or recognized by the reading device, for example, which in this case is assigned to the manipulator system. The manipulator control is only released if the identifier has been read or recognized correctly.

The first and second wireless communication devices can be WLAN devices, Bluetooth devices, Zigbee devices, or other wireless communication devices, for example. The data of the optically readable identifier may include image data of the optically readable identifier, such as the individual pixels of a QR code, and/or data from which the optically readable identifier can be generated. For example, if the data of the optically readable identifier are first transmitted from the control device to the mobile operating device and then the optically readable identifier is displayed on the electronic display of the mobile operating device, an optical reading device of the control device can detect the optically readable identifier. The detected data can then be compared with the previously transmitted data. If the data matches, the optically readable identifier has been correctly detected and it can be assumed that the mobile operating device is located in the vicinity of the control device or the manipulator to be controlled.

Preferably the optical reading device is assigned to the control device and the electronic display device with the mobile operating device, the electronic display device preferably being integrated in a housing of the mobile operating device. If the electronic display device is assigned to the mobile operating device, the graphical user interface (GUI) can be displayed directly on the same electronic display device of the mobile operating device.

Alternatively, the optical reader is assigned to the mobile operating device and the electronic display device is assigned to the control device, the optical reader preferably being integrated in a housing of the mobile operating device. In this case, an additional electronic display device assigned to the control device is required in addition to the electronic display device of the mobile operating device. Typically, the optical reading device is integrated in the housing of the mobile operating device and can be an existing camera of a smartphone, a tablet computer or a laptop computer, for example, so that no additional reading devices are required. Here it is advantageous to integrate the mobile operating device and the optical reading device in one housing in order to ensure that the mobile operating device is actually in the vicinity of the electronic display device (which in this case is assigned to the control device). If the electronic display device is located on or near the control device or the manipulator to be controlled, it can be ensured that the mobile operating device is located near the control device or the manipulator to be controlled.

Preferably, the optical reading device is a camera, an optical scanner and/or a laser scanner, regardless of its assignment. A camera is advantageous because cameras are usually already integrated in hand-held devices such as laptop computers, tablet computers, smartphones and the like. Therefore, no further (supplementary) hardware devices are necessary. An optical scanner and/or a laser scanner, on the other hand, are advantageous because these devices are specially designed for the detection of optically readable identifiers and are very powerful in this area, even under difficult lighting conditions, for example. This allows for simple and trouble-free recognition of the optical identification. Moreover, such systems are cost-effective. It is often advantageous to use an optical scanner and/or a laser scanner, especially if the optical reading device is assigned to the control device.

Preferably, the optically readable identifier comprises data or is based on data which include status parameters of the manipulator system and/or control variables. For example, a status parameter can contain information about the currently loaded operating program of the manipulator or other information, such as the current position of the manipulator. The data may also contain current status parameters of the mobile operating device. Examples of control variables are randomly generated data such as control totals, which release error correction mechanisms, or variables such as unique identification of the manipulator system and/or the manipulator or unique identification of the mobile operating device, so that an intervention in the control of the manipulator can be clearly assigned to a specific mobile operating device. Thus, the control of the manipulator can be logged by the mobile operating device and assigned to a certain mobile operating device or a certain user.

The optically readable code is preferably variable in time and/or one- or two-dimensional code, with the optically readable code preferably being a QR code. Time-varying optically readable identifiers have the advantage that they are more difficult to avoid when identifying the mobile operating device. If, for example, the same identifier is always transmitted, a printout of this identifier can theoretically be generated and the optical reading device kept available. However, such an abuse (e.g., to avoid prescribed but inconvenient security procedures) is technically more difficult to implement than photographing an identifier, which, for example, is attached to the manipulator to be controlled in the form of a sticker. For example, it is preferable to change the optically readable code while it is displayed on the electronic display device. Such a chronological change is known, for example, from TAN generation in online banking. The provision of the optically readable identifier in the form of a QR code is also preferred. QR codes currently offer the possibility of storing 2956 bits. Consequently, QR codes offer the possibility to transfer a large amount of data from the electronic display device to the optical reading device Preferably, the mobile operating device is a hand-held mobile operating device, in particular a wireless handheld device such as a laptop computer, a tablet computer, a smartphone and/or a smart watch. Such handheld devices are advantageous because they are universal and can be adapted to specific manipulator systems, using apps, for example. This makes it possible to control several manipulators and even several manipulator systems with only one mobile operating device. Furthermore, laptop computers, tablet computers, smartphones and/or smart watches in particular can be purchased at low cost due to their high availability in the field of consumer electronics.

Preferably, the manipulator system comprises several manipulators, the control device being assigned several manipulators, and each manipulator being assigned an optical reading device or an electronic display device. This makes it possible to achieve the advantages described above and in particular the spatial assignment of graphical user interface (GUI) and/or mobile operating device to a manipulator, where the manipulator is used in a manipulator system with several manipulators.

The task is further solved by a method for identifying a mobile operating device for controlling at least one manipulator of a manipulator system, wherein the manipulator system has a control device assigned to the manipulator and wherein the mobile operating device preferably has a graphical user interface (GUI). The method has the following method steps:

a) Display of at least one optically readable identifier on an electronic display device, the electronic display device being assigned to the control device or the mobile operating device;

b) Detection of the optically readable identifier by means of an optical reading device, the optical reading device being assigned to the other of the control device or mobile operating device (i.e., if the electronic display device is assigned to the operating device, the reading device is logically assigned to the control device and vice versa);

c) Release of the control of the manipulator for control by means of the mobile operating device if the optically readable identifier has been correctly detected by the optical reading device.

The method steps of displaying (a) detection (b) and release (c) make it possible to check whether the mobile operating device is in the vicinity of the manipulator to be controlled at the time of release. The control can be released, for example, by displaying the graphical user interface only after the optically readable identifier has been correctly detected by the optical reading device. The release itself can be done by the mobile operating device, the control device or globally in the manipulator system. The control of the manipulator made possible after the release preferably takes place via the graphical user interface of the mobile operating device.

Preferably, the method further comprises before step a) the method steps of transmitting data of the optically readable identifier from the control device to the mobile operating device and displaying the identifier on the electronic display device of the mobile operating device or vice versa, i.e., transmitting data of the optically readable identifier from the mobile operating device to the control device and displaying the identifier on the electronic display device of the control device.

Transmission of the data of the optically readable identifier is preferably wireless, after the operating device and control device have connected to each other via an appropriate communication protocol. After transmission, the identifier can be displayed and read, and the control is only released after correct acquisition. This method releases particularly safe operation, since the identifier can be generated dynamically in a simple manner, i.e., a separate identifier can be generated for each coupling process.

Preferably (i) the optical reading device is assigned to the control device and the electronic display device to the mobile operating device, wherein the electronic display device is preferably integrated in a housing of the mobile operating device. Alternatively (ii) the optical reading device is assigned to the mobile operating device and the electronic display device to the control device, in which case the optical reading device is preferably integrated in a housing of the mobile operating device.

Alternative (i) makes it possible to ensure that the electronic display device assigned to the mobile operating device is located in the immediate vicinity of the optical reading device and thus, if the optical reading device is located in the immediate vicinity of the manipulator to be controlled, in the immediate vicinity of the manipulator to be controlled. In alternative (ii), the optical reading device is preferably integrated in a housing of the mobile operating device, so that after detection of the optically readable identifier it can be ensured that the entire mobile operating device is located in the vicinity of the electronic display device assigned to the control device.

Preferably, the data of at least one optically readable identifier and/or the optically readable identifier is dynamically generated by the control device or mobile operating device. The dynamic generation results in a time-varying optically readable identifier and/or data and makes it difficult to bypass the system. Since the optically readable identifier is variable in time, the system cannot be bypassed, for example by using an (unauthorized) paper printout of the optically readable identifier.

Preferably, in method step a) several optically readable identifiers are displayed in chronological order, wherein the control of the manipulator is only released if the several optically readable identifiers have been correctly detected by the optical reading device. The use of several optically readable identifiers makes circumvention of the system even more difficult, since, for example, circumvention by means of an (unauthorized) paper printout becomes impossible. In particular, the use of several optically readable identifiers in chronological order releases the transmission of large amounts of data. For example, if QR codes are used as optically readable identifiers, a data volume of 2956 bits can be transmitted with each displayed QR code. This releases the optical transmission of a multitude of data, e.g., status parameters of the manipulator system and/or control variables.

Preferably, the optically readable identification is generated from the transmitted data of the optically readable identifier. This means that the transfer of individual pixels or an image file of the optically readable identifier is not necessary, so that, for example, the amount of data to be transferred can be kept to a minimum.

Preferably at least the method steps a) to c) are repeated in defined time intervals, where the defined time intervals are preferably less than 15 minutes, even more preferably less than 10 minutes and even more preferably less than 5 minutes. Repeating steps a) to c) ensures that the mobile operating device remains or must remain in the vicinity of the control device or the manipulator to be controlled even after coupling with the control device. It is advantageous to choose a time interval that is long enough so that the control of the manipulator by the user is not hindered, or that the time interval only begins from the time when the last control input was made by the user.

DESCRIPTION OF THE FIGURES

In the following, the invention is described in more detail with reference to the figures.

Figure 1A:
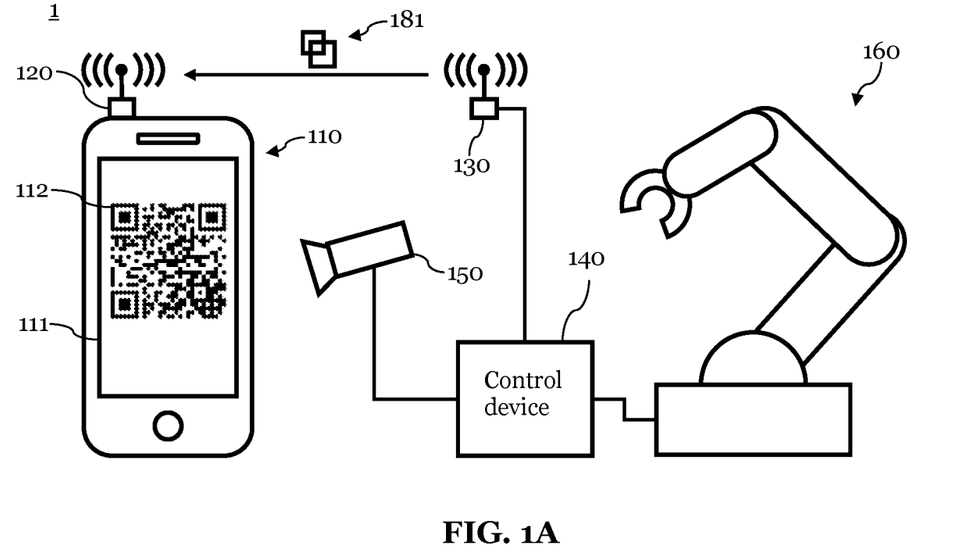
FIG. 1A shows a schematic representation of a manipulator system for identification of mobile operating devices before or during identification.

In particular, FIG. 1A shows a schematic representation of a manipulator system 1 for the identification of mobile operating devices no before or while the graphical user interface 113 (shown in FIG. 1B) of the mobile operating device 110 is released. The operating device no is preferably a smartphone or a tablet computer. The mobile operating device no comprises at least one electronic display device 111, namely a display, and a first wireless communication device 120.

A control device 140 is assigned to the manipulator 160 of the manipulator system 1, which controls the manipulator. Furthermore, a second wireless communication device 130 and an optical reading device 150 are assigned to the control device 140. The control device 140 can comprise both software and hardware and can be integrated in the manipulator 160 or set up in a separate housing. In addition, the control device 140 can be set up to control several manipulators 160. Preferably, if the control device 140 is assigned several manipulators 160, each manipulator 160 is assigned an optical reading device 150 or electronic display device 270.

The optical reading device 150 is preferably located in the immediate vicinity of the manipulator 160. To identify the mobile operating device 110, data 181 of an optically readable identifier 112 are transmitted to the first wireless communication device 120 by means of the second wireless communication device 130. According to the transmitted data 181, the electronic display device 111 of the operating device no displays the optically readable identifier 112.

As shown in FIG. 1A, the optically readable identifier 112 is, for example, a QR code that can be captured by the optical reading device 150. If the optically readable identifier 112 is correctly detected by the optical reading device 150 (i.e., the identifier is detected without error and corresponds to the expected identifier according to the data 181), control of the manipulator 160 is released so that the manipulator can be operated using the graphical user interface 113 of the mobile operating device 110.

Figure 1B:
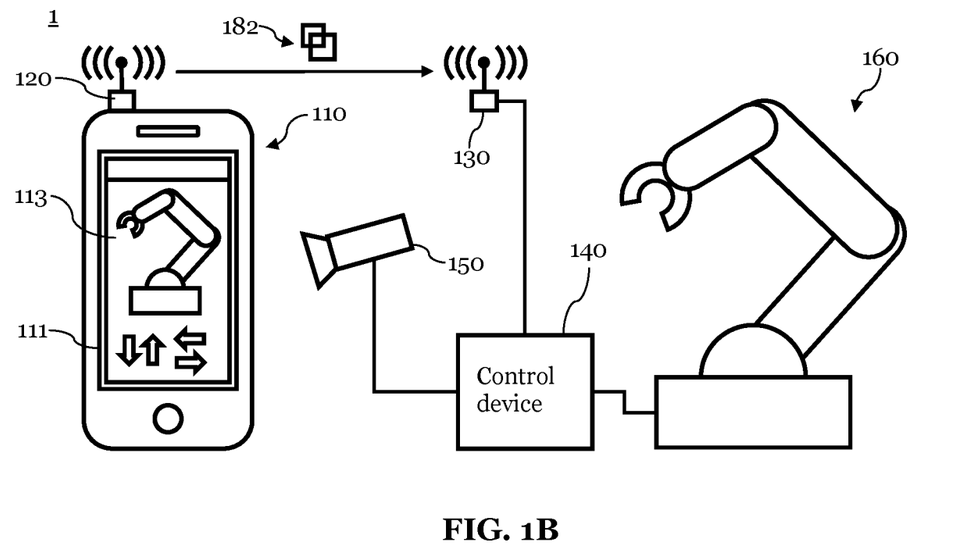
FIG. 1B shows a schematic representation of the manipulator system for identification of mobile operating devices according to FIG. 1A after successful identification.

A released control is shown, for example, in FIG. 1B. The same reference signs in FIG. 1A and FIG. 1B each refer to the same components of the depicted manipulator system. A user can make entries on the mobile operating device 110 to control the manipulator 160 by means of the graphical user interface 113 of the mobile operating device 110. Preferably, the electronic display device 111, which also displays the graphical user interface 113, is a touch-sensitive screen, such as a capacitive touch screen. The inputs (operating commands) concerning the control of the manipulator 160 are sent to the second wireless communication device 130 via the first wireless communication device 120 by means of the data 182 and made available to the manipulator 160 via the control device 140.

Figure 2:
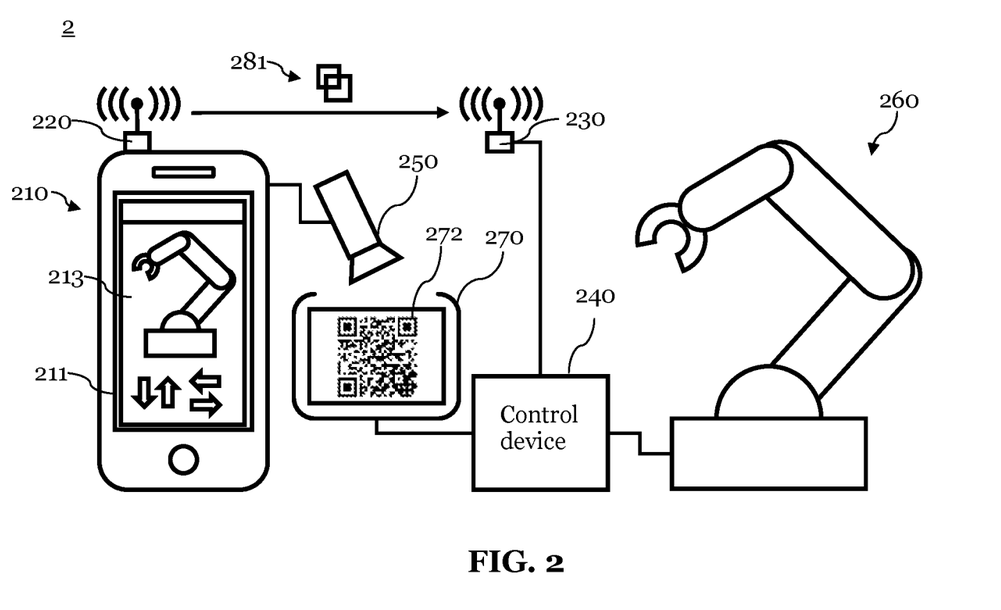
FIG. 2 shows a schematic representation of a further manipulator system for the identification of mobile operating devices.

FIG. 2 shows a schematic representation of a manipulator system 2 for identification of a mobile operating device 210. The mobile operating device 210 comprises a graphical user interface (GUI) 213, which is displayed on an electronic display device 211 assigned to the GUI. The graphical user interface 213 must first be released before the mobile operating device 210 can control the manipulator 260.

Furthermore, the mobile operating device 210 comprises a first wireless communication device 220, which can send data 281 to a second wireless communication device 230. The second wireless communication device 230 is assigned to a control device 240 of the manipulator 260. An electronic display device 270 is also assigned to the control device 240. The electronic display device 270 is designed to display an optically readable identifier 272, which corresponds to the transmitted data 281.

The mobile operating device 210 also includes an optical reading device 250, which is preferably integrated in the housing of the mobile operating device. The optical reading device 250 is designed to detect the optically readable identifier 272 displayed on the electronic display device 270. If the optically readable identifier 272 is detected by the optical reading device 250 and the acquired data matches the transmitted data 281, it can be assumed that the mobile operating device 210 is located near the electronic display device. After correct detection of the optically readable identifier 272, the graphical user interface 213 can be released. It can be released by displaying the graphical user interface 213 on the electronic display device 211 of the mobile operating device 210, or by only then enabling its operation.

Figure 3:
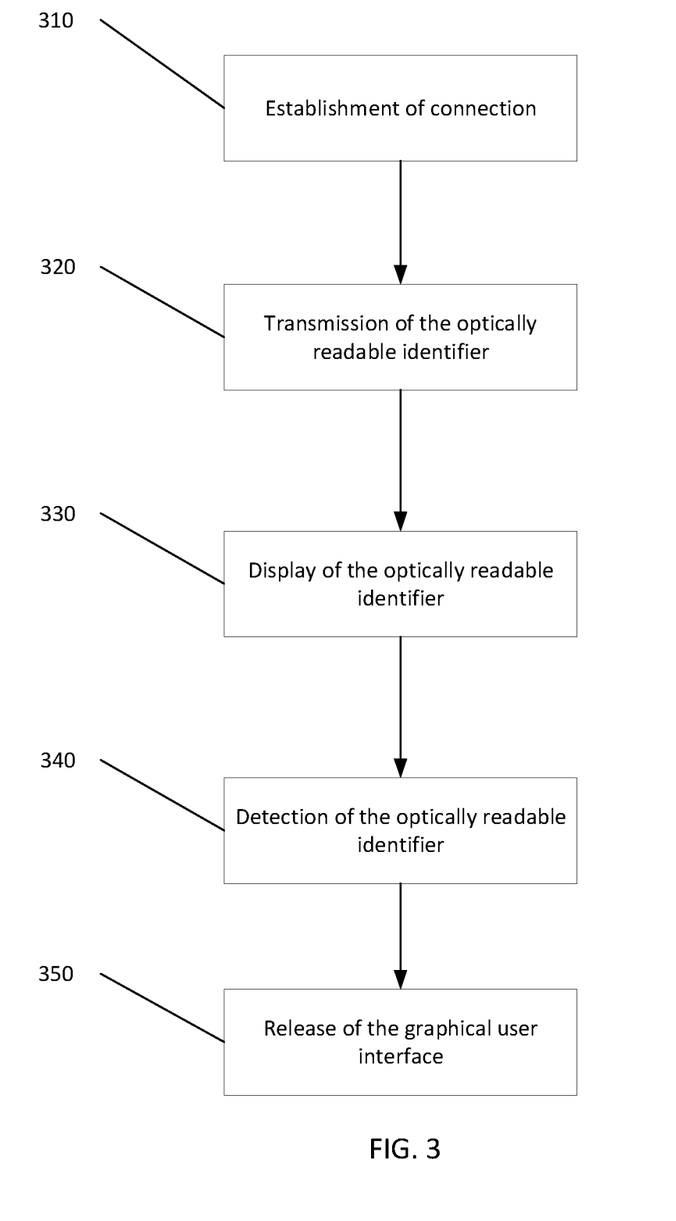
FIG. 3 shows a schematic flow chart of a procedure for the identification of mobile operating devices.

FIG. 3 shows a schematic flow chart of a method 3 for the identification of mobile operating devices. The method is described with reference to the example in FIG. 1A, but it also works in the same way as with the example in FIG. 2 In a first method step 310, a request is sent from a mobile operating device 110 or a control device 140, which determines whether a mobile operating device 110 is present in the vicinity of the control device 140.

If a mobile operating device 110 is present near the control device 140, data 181 of at least one optically readable identifier 112 is transmitted from the control device 140 to the mobile operating device no in a second method step 320.

After successful transmission of the data 181, an optically readable identifier 112 is generated from the data in a third method step 330 and displayed on the electronic display device 211. After displaying the identifier 112 in method step 330, the optically readable identifier is detected in a fourth method step 340 using the optical reading device 150. In a fifth method step 350, the identification is checked and the control of the manipulator 160 is released by means of a graphical user interface 113 of the mobile operating device 110 if necessary.

LIST OF REFERENCE CHARACTERS 1, 2 System
3 Method
110, 210 Operating devices
111, 211 Display device of the operating device
112, 272 Optically readable identifiers
113, 213 Graphical user interface GUI
120, 220 First wireless communication device
130, 230 Second wireless communication device
140, 240 Control device (software and/or hardware)
150, 250 Optical reading device
160, 260 Manipulator
181, 281 Data of the optically readable identifier
182 Data for operation
270 Display device of the control device
310 Establishment of connection
320 Transmission the optically readable identifier
330 Display of the optically readable identifier
340 Detection of the optically readable identifier
350 Release of the graphical user interface

The invention claimed is:

1. A method for identifying a mobile operating device which is arranged for controlling at least one manipulator of a manipulator system, the manipulator system having a control device assigned to the manipulator and the mobile operating device having a graphical user interface (GUI), comprising the following method steps:
    a) transmitting data of at least one optically readable identifier from the control device to the mobile operating device and display of the optically readable identifier on an electronic display device, wherein the electronic display device is assigned to the mobile operating device, or transmitting data of the at least one optically readable identifier from the mobile operating device to the control device and display of the optically readable identifier on an electronic display device assigned to the control device;
    b) displaying the at least one optically readable identifier on the electronic display device assigned to the control device or the mobile operating device, wherein the data of the optically readable identifier comprises data including at least one of status parameters of the manipulator system or control variables;
    c) detecting the optically readable identifier by means of an optical reading device, wherein the optical reading device is assigned to the respective other one of the control device or mobile operating device; and
    d) releasing control of the manipulator to the mobile operating device when the optically readable identifier has been correctly detected by the optical reading device.

2. The method according to claim 1, wherein
    i) the optical reading device is assigned to the control device, wherein the electronic display device is assigned to the mobile operating device and wherein the electronic display device is integrated in a housing of the mobile operating device, or
    ii) wherein the optical reading device is assigned to the mobile operating device, and wherein the electronic display device is assigned to the control device.

3. The method according to claim 1, wherein the data of the at least one optically readable identifier are dynamically generated by means of the one control device or mobile operating device.

4. The method according to claim 1, wherein at least the method steps a) to c) are repeated in defined time intervals, wherein the defined time intervals are less than 15 minutes.

5. The method according to claim 1, wherein the mobile operating device comprises a wireless handheld device.

6. The method according to claim 1, wherein the mobile operating device includes a graphical user interface (GUI).

7. The method according to claim 4, wherein the defined time intervals are less than 10 minutes.

8. The method according to claim 4, wherein the defined time intervals are less than 5 minutes.

9. The method according to claim 2, wherein the optical reading device is integrated in a housing of the mobile operating device.

10. A manipulator system comprising:
- at least one manipulator and a control device assigned to the manipulator;
- at least one mobile operating device which is arranged for controlling at least one of the at least one manipulator or the control device;
- at least one electronic display device which is arranged to display at least one optically readable identifier, and
- at least one optical reading device which is arranged to detect the displayed optically readable identifier,
- wherein the manipulator system is arranged to release control of the manipulator or the control device to the mobile operating device when the optically readable identifier has been correctly detected by the optical reading device,
- wherein the optically readable identifier comprises data including at least one of status parameters of the manipulator system or control variables,
- wherein the mobile operating device comprises a first wireless communication device and the control device comprises a second wireless communication device, and the first and second wireless communication devices are arranged to transmit data of the optically readable identifier, and
- wherein the electronic display device is arranged to display the optically readable identifier according to the transmitted data.

11. The manipulator system according to claim 10, wherein the optical reading device is assigned to the control device, wherein the electronic display device is assigned to the mobile operating device, and wherein the electronic display device is integrated in a housing of the mobile operating device.

12. The manipulator system according to claim 10, wherein the optical reading device is assigned to the mobile operating device, and
- wherein the electronic display device is assigned to the control device, and wherein the optical reading device is integrated in a housing of the mobile operating device.

13. The manipulator system according to claim 10, wherein the optical reading device comprises one of a camera, an optical scanner or a laser scanner.

14. The manipulator system according to claim 10, wherein the optically readable identifier is variable in time and comprises a one- or two-dimensional code.

15. The manipulator according to claim 10, wherein the mobile operating device is a hand-held mobile operating device.

16. The manipulator according to claim 10, wherein the manipulator system comprises a plurality of manipulators, wherein the plurality of manipulators are assigned to the control device, and wherein an optical reading device or an electronic display device is assigned to each manipulator.

17. The manipulator system according to claim 10, wherein the mobile operating device includes a graphical user interface (GUI).

18. The manipulator system according to claim 14, wherein the optically readable identifier comprises a QR code.

19. The manipulator system according to claim 15, wherein the hand-held mobile operating device is selected from the group consisting of laptop computers, tablet computers, smartphones and smart watches.

20. A method for identifying a mobile operating device which is arranged for controlling at least one manipulator of a manipulator system, the manipulator system having a control device assigned to the manipulator and the mobile operating device having a graphical user interface (GUI), comprising the following method steps:
- a) displaying at least one optically readable identifier on an electronic display device, wherein the electronic display device is assigned to the control device or the mobile operating device;
- b) detecting the optically readable identifier by means of an optical reading device, wherein the optical reading device is assigned to the respective other control device or mobile operating device; and
- c) releasing control of the manipulator to the mobile operating device when the optically readable identifier has been correctly detected by the optical reading device,
- wherein in method step a) several optically readable identifiers are displayed in chronological order, and wherein the step of releasing the control of the manipulator to the mobile operating device takes place only when the several optically readable identifiers have been correctly detected by the optical reading device.

* * * * *